United States Patent
Hercock et al.

(10) Patent No.: US 12,488,013 B2
(45) Date of Patent: Dec. 2, 2025

(54) IDENTIFYING RELATIONSHIPS IN DATA

(71) Applicant: BRITISH TELECOMMUNICATIONS PUBLIC LIMITED COMPANY, London (GB)

(72) Inventors: Robert Hercock, London (GB); Jonathan Roscoe, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 215 days.

(21) Appl. No.: 18/258,766

(22) PCT Filed: Dec. 7, 2021

(86) PCT No.: PCT/EP2021/084650
§ 371 (c)(1),
(2) Date: Jun. 21, 2023

(87) PCT Pub. No.: WO2022/135916
PCT Pub. Date: Jun. 30, 2022

(65) Prior Publication Data
US 2024/0045962 A1     Feb. 8, 2024

(30) Foreign Application Priority Data

Dec. 22, 2020   (GB) .................................. 2020440

(51) Int. Cl.
*G06F 16/2458*   (2019.01)
*G06F 18/213*    (2023.01)
*G06F 40/279*    (2020.01)

(52) U.S. Cl.
CPC ........ *G06F 16/2468* (2019.01); *G06F 18/213* (2023.01); *G06F 40/279* (2020.01)

(58) Field of Classification Search
None
See application file for complete search history.

(56) References Cited

U.S. PATENT DOCUMENTS

| 2018/0255084 A1 | 9/2018 | Kotinas et al. |
| 2019/0007434 A1 | 1/2019 | Mclane et al. |
| 2020/0045075 A1* | 2/2020 | Kliger .................. H04W 12/12 |

FOREIGN PATENT DOCUMENTS

| WO | 2020033072 A1 | 2/2020 |
| WO | 2020114920 A1 | 6/2020 |

OTHER PUBLICATIONS

Stuart G. Fischer, et al., "Length-independent separation of DNA restriction fragments in two dimensional gel electrophoresis", Nucleic Acids Research, vol. 13, No. 9, Accepted Apr. 5, 1985, 15 pages.

(Continued)

*Primary Examiner* — Amresh Singh
(74) *Attorney, Agent, or Firm* — Nixon & Vanderhye P.C.

(57) ABSTRACT

A computer implemented method of clustering computer systems in a plurality of systems to identify computer systems being subject to a common security occurrence, each computer system generating data records corresponding to security events in respect the systems, the method comprising: receiving a set of one or more data records associated with each computer system, each record including a sequence of data fields; generate a vector embedding for each data field in each record; evaluate a distance of each vector embedding from a reference vector as an indicator of semantic distance; identifying similar data records based on a measure of a degree of similarity of the distances of vector embeddings for each record; defining a cluster of computer systems including computer systems associated with the similar data records for applying protective measures to the computer systems in the cluster.

19 Claims, 2 Drawing Sheets

(56) References Cited

OTHER PUBLICATIONS

International Search Report and Written Opinion of the ISA for PCT/EP2021/084650 mailed Mar. 21, 2022, 9 pages.
Combined Search Report and Examination Report for GB Application No. 2020440.0 dated Apr. 19, 2021, 6 pages.
Communication under Rule 71(3) EPC dated Mar. 27, 2025 issued for European Application No. 21 831 284.1-1218 (8 pages).
International Preliminary Report on Patentability dated Jun. 13, 2023 issued for International Application No. PCT/EP2021/084650 (7 pages).

* cited by examiner

IDENTIFYING RELATIONSHIPS IN DATA

This application is the U.S. national phase of International Application No. PCT/EP2021/084650 filed Dec. 7, 2021 which designated the U.S. and claims priority to GB Patent Application No. 2020440.0 filed Dec. 22, 2020, the entire contents of each of which are hereby incorporated by reference.

The present invention relates to the identification of relationships between data items in a data set.

BACKGROUND AND SUMMARY

The process of data clustering from unstructured data is an essential component of data analytics and classification. There are a range of existing clustering methods including K-means, density-based spatial clustering of applications with noise (DBSCAN), hierarchical, optic, and Affinity Propagation. Each method is suited to specific data types, for example determined by whether the data is linearly separable.

Data clustering finds particular application in the analysis of data sets for the purpose of identifying groups of related data items. Practical applications include: in communications network security such as by clustering events occurring in the network, in systems communicating via the network and the like; in computer security such as by clustering events occurring in a computer system; and in entity analysis in respect of computer security such as by clustering events occurring in respect of entities such as computer systems, actors like users or the like, such as behaviours of the entities. Such clustering feeds downstream processing such, inter alia: as machine learning for the purpose of malicious behaviour or vulnerable state detection; scoping an extent of security issue in terms of a part, portion or extent of a network or set of computer systems implicated or affected; and deployment of remediation or protective measures for affected computer systems or networks.

Whereas existing clustering techniques can be effective, they can be resource intensive and specific to particular data-types such as text or media. Accordingly there is a need to improve the identification of relationships between data items for the purpose of identifying clusters of related data items.

According to a first aspect of the present invention, there is provided a computer implemented method of clustering computer systems in a plurality of systems to identify computer systems being subject to a common security occurrence, each computer system generating data records corresponding to security events in respect the systems, the method comprising: receiving a set of one or more data records associated with each computer system, each record including a sequence of data fields; generate a vector embedding for each data field in each record; evaluate a distance of each vector embedding from a reference vector as an indicator of semantic distance; identifying similar data records based on a measure of a degree of similarity of the distances of vector embeddings for each record: defining a cluster of computer systems including computer systems associated with the similar data records for applying protective measures to the computer systems in the cluster.

Preferably, the vector embedding is a prediction-based vector embedding generated with a neural network trained on a corpus of data records of fields to semantically represent the fields.

Preferably, the reference vector is selected statistically from the vector embeddings for the data fields in the set of data records.

Preferably, the reference vector is an average of the vectors embeddings for the data fields.

Preferably, the data records include textual representations of security events, and the data fields include sets of one or more words in each record.

Preferably, identifying similar data records includes: generating a model of the measure of a degree of similarity of distances of embeddings for each record including an indication of a number of distances for the record being within a series of predetermined ranges of distance, the indication identifying a degree of concentration of each range of distances for the record; and identifying records having a degree of concentration meeting a threshold degree in one or more common ranges of distance as similar records based on the model.

According to a second aspect of the present invention, there is a provided a computer system including a processor and memory storing computer program code for performing the steps of the method set out above.

According to a third aspect of the present invention, there is a provided a computer system including a processor and memory storing computer program code for performing the steps of the method set out above.

BRIEF DESCRIPTION OF THE DRAWINGS

Embodiments of the present invention will now be described, by way of example only, with reference to the accompanying drawings, in which.

DETAILED DESCRIPTION OF PRESENT EXAMPLE EMBODIMENTS

Figure 1:
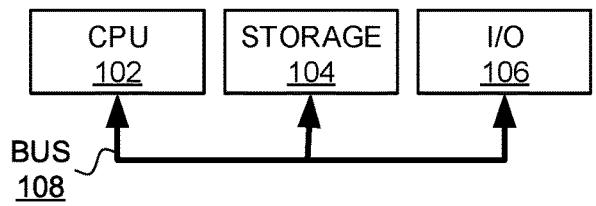
FIG. 1 is a block diagram a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
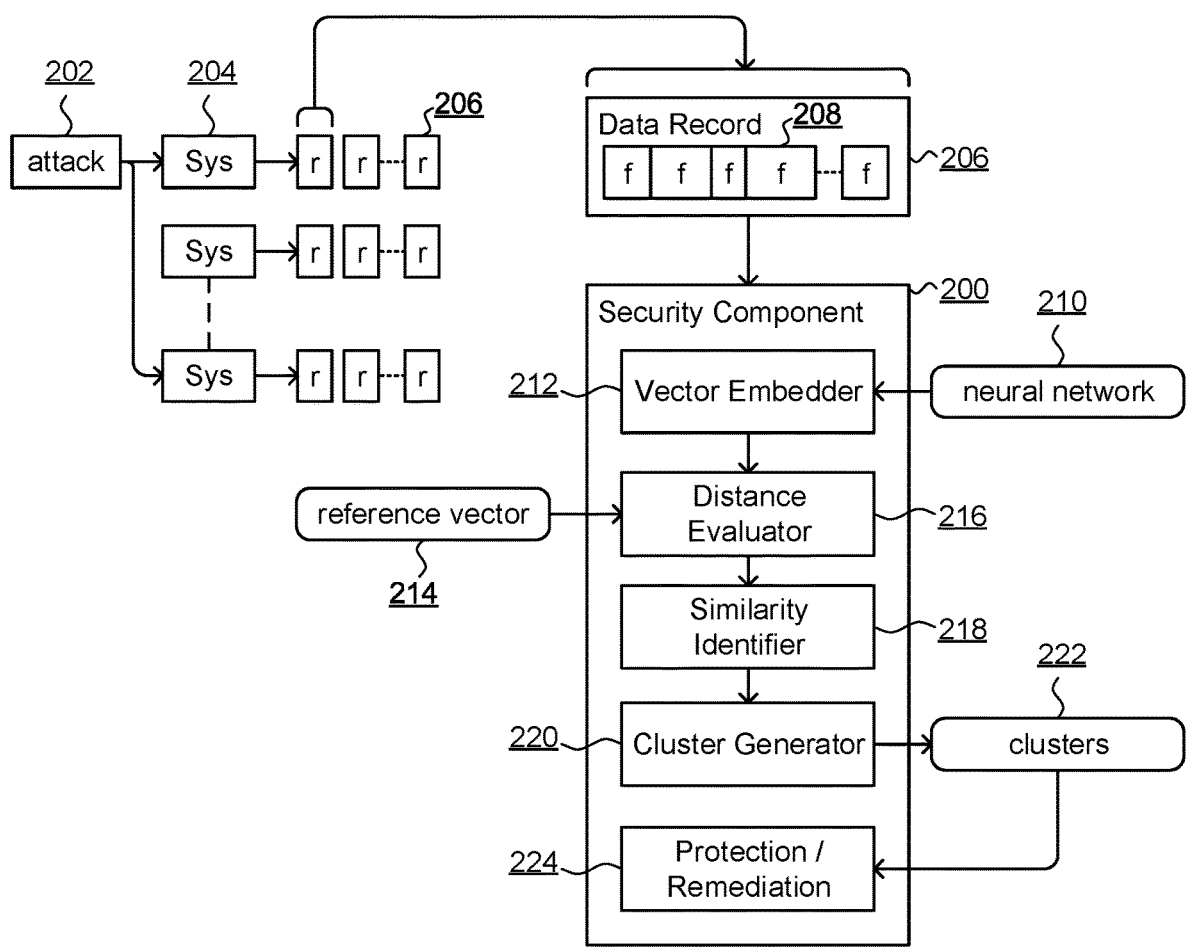
FIG. 2 is a component diagram of a security component adapted to cluster data records corresponding to security events for computer systems to identify computer systems subject to common security occurrences in accordance with embodiments of the present invention.

FIG. 2 is a component diagram of a security component 200 adapted to cluster data records 206 corresponding to security events for at least two computer systems 204 to identify computer systems subject to common security occurrences such as a security attack 202 in accordance with embodiments of the present invention. Some or all of the plurality of computer systems 204, such as network connected computer systems, may be vulnerable to and/or subject to a security attack 202 such as infection or targeted communication by malware, virus, adware, or by hijacking, misappropriation, misuse, denial-of-service or other attacks as are known to those skilled in the art. The computer systems 204 generate data records 206 such as records generated by, for example, inter alia: security facilities executing in, with or by the systems such as virus scanners, malware detectors, proxies, firewalls, intrusion detection, network monitoring facilities and the like; operating system event generators and/or monitors; network monitors and/or scanners; reports generated automatically or manually such as by users, operators or owners of systems; event generators; logging facilities; and other data record sources as will be apparent to those skilled in the art. Each data record 206 includes a sequence of data fields 208 which may be commonly structured within or between records, or may be different within a record, between records, or between records for different computer systems. In some embodiments, the data records 206 for a computer system include a combination of records generated by or originating from different data sources, and the source(s) of data records by different computer systems 204 may be disparate and non-overlapping.

The security component is a hardware, software, firmware or combination component adapted to receive data records 206 including sequences of data fields 208 from each of the plurality of computer systems 204. The security component 200 is operable to receive and process data records 206 for the plurality of computer systems 204 so as to cluster the systems 204 into clusters of systems. The clustering is performed with the objective that computer systems in a cluster are subject to one or more common security occurrences such as the attack 202. The security component 200 includes a vector embedder component 212 as a software, hardware, firmware or combination component arranged to apply a vector embedding to each field 208 in a sequence of fields for each data record 206 received by the security component 200. In preferred embodiments, the vector embedding is a prediction-based vector embedding generated with a neural network 210, such as a neural network 210 trained on a corpus of data items such as data fields 208 to represent the semantic meaning of the data fields. Such prediction-based vector embedding is known to those skilled in the art from fields such as natural language processing (NLP). Each vector embedding generated by the vector embedder 212 is referable to a field 206, record 208 and/or computer system 204 from which it was received.

The security component further includes a distance evaluator component 216 as a hardware, software, firmware or combination component for evaluating a distance of each vector embedding generated by the vector embedder 212 from a reference vector 214. In some embodiments, the reference vector 214 is selected statistically from the set of vector embeddings for the fields of the received data records 206. For example, the reference vector 214 can be selected as an average, median or mode vector in the set of vector embeddings. Thus, the distance evaluator 216 evaluates a distance from the reference vector 214 for each vector embedding generated by the vector embedder 212, such distances being associated with a respective vector embedding and, thus, directly or indirectly associated with a field 208 in a record 206 from a computer system 204 for which the embedding was generated.

The security component 200 further includes a similarity identifier 218 as a hardware, software, firmware or combination component for identifying similar data records 206 in the set of received records. The similarity is determined based on a measure of a degree of similarity of the distances of vector embeddings for the records, such as distances within a predetermined range of distances.

Figure 3:
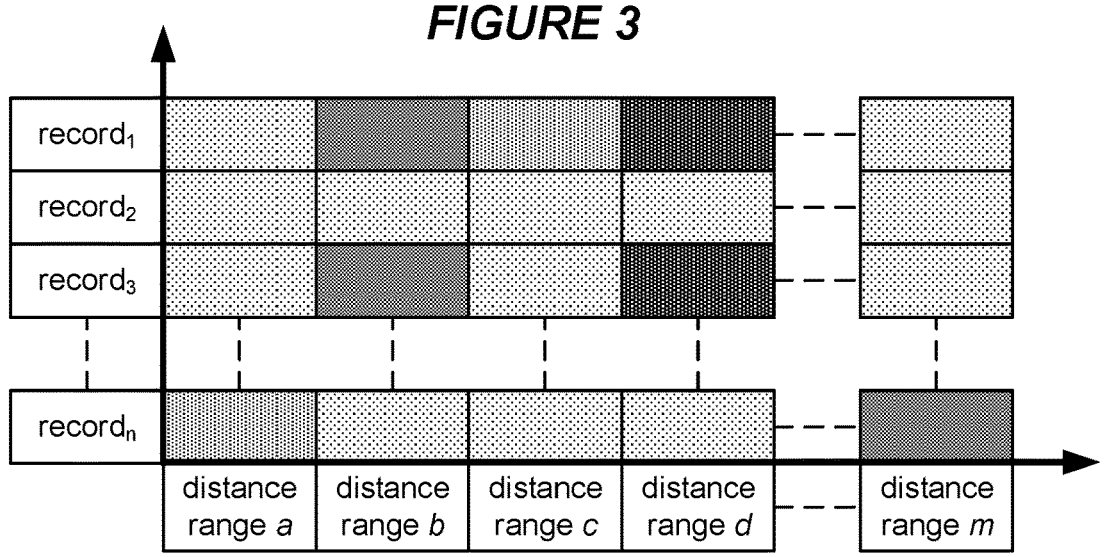
FIG. 3 is an illustrative depiction of a representation of concentrations of ranges of distances measures for each of a plurality of exemplary records in accordance with embodiments of the present invention.

In some embodiments, the identification of similar data records is achieved by generating a model of the measure of a degree of similarity of distances of embeddings for each record. For example, a number of distances for each record being within a predetermined range of distances can be indicated in the model such that a degree of concentration or frequency of fields having vector distances in each range is indicated for each record. By way of example, FIG. 3 illustrates a depiction of a representation of concentrations of ranges of distances measures for each of a plurality of exemplary records in accordance with embodiments of the present invention. In FIG. 3, records 1 to n each have indications of a frequency or concentration of fields having a vector distance within each of a series of distance ranges a to m, with greater concentrations being indicated in FIG. 3 by darker shading. Thus, it can be seen from FIG. 3 that exemplary record$_1$ has a relatively high concentration of fields with vector distances in the ranges b and d, with relatively a low concentration of fields with vector distances in the range a. While the depiction of FIG. 3 is illustrated graphically it will be appreciated by those skilled in the art that the relative concentrations can be depicted numerically or otherwise in the model for processing by a computer system. Similarities between data records are therefore identifiable by the similarity identifier 218 based on a model such as that exemplified in FIG. 3 by comparisons of relative concentrations of field distances in each distance range. For example, in FIG. 3 record$_1$ and record$_3$ exhibit similarly notable relative concentrations at vector distance ranges b and d, whereas record$_2$ and record$_n$ are dissimilar. Thus, record$_1$ and record$_3$ can be identified by the similarity identifier 218 as similar.

Parallels can be drawn with the process of gel electrophoresis of deoxyribonucleic acid (DNA) for identifying similarities of DNA sequences in which separation of DNA nucleotide fragments into clusters is performed based on mass and size of nucleotide fragments. Each nucleotide fragment has a negative charge that is directly proportional to its mass and an applied potential difference gradient across the gel imparts a net force on each nucleotide fragment resulting in movement by a distance through the gel in proportion to their mass. The result is concentrations of nucleotide fragments at positions between the electrical extremes of the gel reflective of the relative mass of the fragments.

Thus, embodiments of the present invention provide for the identification of similarities between records 206 associated with computer systems 204 which constitutes a useful basis for identifying similarities between the computer systems 204 themselves. Accordingly, the security component 200 further includes a cluster generator 220 for clustering the computer systems 204 into clusters 222 based on similarity of records 206 from the computer systems 204 identified by the similarity identifier 218. The clusters 222 of computer systems 204 thus indicate computer systems 204 detected as exhibiting common features via their data records 206 such that clustered computer systems are indicated as being subject to a common security occurrence such as attack 202.

In some embodiments, the security component 200 includes a protection and/or remediation component 224 as one or more hardware, software, firmware or combination components for deploying protection measures or remediation measures for computer systems 204 in a cluster 222 where such computer systems 204 are identified as being subject to a common security occurrence such as attack 202. For example, protective and/or remediation measures can include, inter alia: cessation or prevention of network communication; interruption of operation; installation, deployment or configuration of security facilities such as intrusion detection, virus detection, anti-malware or other facilities; and other measures as will be apparent to those skilled in the art.

In some embodiments, a model generated for the identification of similarities of data records 206 may be realised in a manner that may be renderable, such as graphically, for the purpose of further processing for the identification clusters of computer systems. For example, a graphical representation such as that illustrated by way of example in FIG. 3 may be processed by a further component for identifying clusters graphically based on the indicated concentrations in the model.

Figure 4:
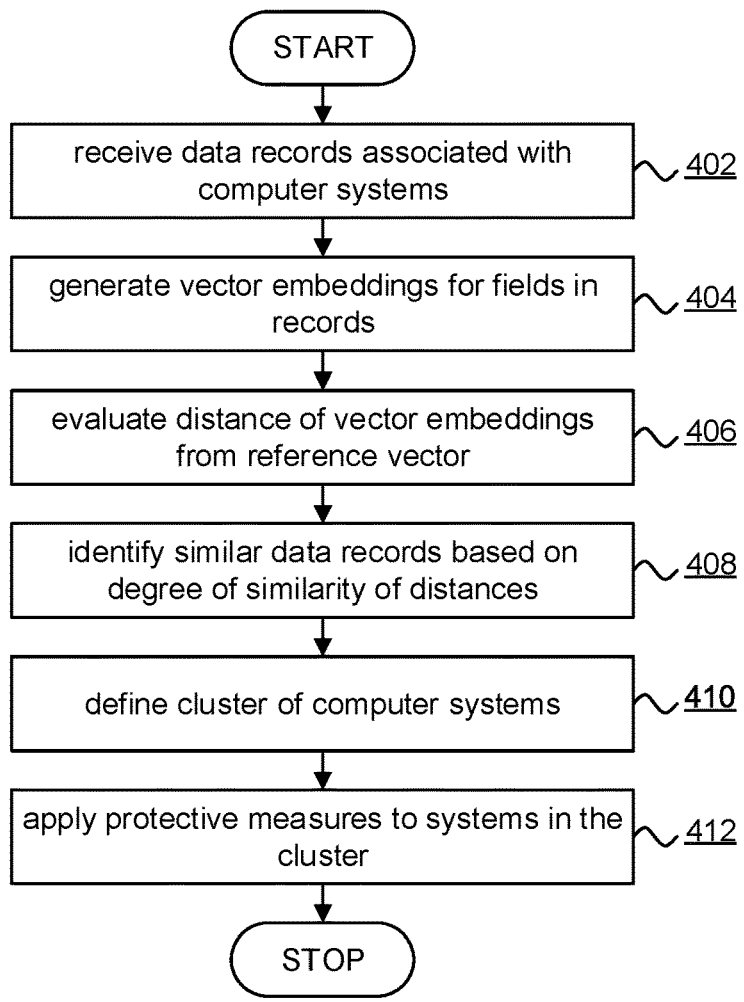
FIG. 4 is a flowchart of a method of clustering data records corresponding to security events in respect of a plurality of computer systems to identify the computer systems as being subject to a common security occurrence in accordance with embodiments of the present invention.

FIG. 4 is a flowchart of a method of clustering data records 206 corresponding to security events in respect of a plurality of computer systems 204 to identify the computer systems as being subject to a common security occurrence in accordance with embodiments of the present invention. Initially, at step 402, the method receives data records 206 associated with the computer systems, each including a sequence of data fields 208. At step 404 the method generates vector embeddings for the fields 208 in the received records 206. At step 406 the method evaluates distance measures for each of the generated vector embeddings of a distance between the embedding and a reference vector. At step 408 the method identifies similar data records based on a degree of similarity of distances of vector embeddings for each record. At step 410 the similar data records are used to identify similar computer systems 204 so as to cluster similar computer systems 204 into clusters 222. At step 412 the method applies protective and/or remediative measures to a cluster of computer systems identified as being subject to a common security occurrence.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A computer implemented method of clustering computer systems in a plurality of systems to identify computer systems being subject to a common security occurrence, each computer system generating data records corresponding to security events in respect of the systems, the method comprising:

receiving a set of one or more data records associated with each computer system, each record including a sequence of data fields;

generating a vector embedding for each data field in each record;

evaluating a distance of each vector embedding from a reference vector as an indicator of semantic distance;

identifying similar data records based on a measure of a degree of similarity of the distances of vector embeddings for each record;

defining a cluster of computer systems including computer systems associated with the similar data records for applying protective measures to the computer systems in the cluster;

wherein identifying similar data records includes;

generating a model of the measure of a degree of similarity of distances of embeddings for each record including an indication of a number of distances for the record being within a series of predetermined ranges of distance, the indication identifying a degree of concentration of each range of distances for the record; and identifying records having a degree of concentration meeting a threshold degree in one or more common ranges of distance as similar records based on the model.

2. The method of claim 1 wherein the vector embedding is a prediction-based vector embedding generated with a neural network trained on a corpus of data records of fields to semantically represent the fields.

3. The method of claim 1 wherein the reference vector is selected statistically from the vector embeddings for the data fields in the set of data records.

4. The method of claim 3 wherein the reference vector is an average of the vectors embeddings for the data fields.

5. The method of claim 1 wherein the data records include textual representations of security events, and the data fields include sets of one or more words in each record.

6. The method of claim 1 wherein the model is graphically renderable, said model is processed by a further component for identifying clusters graphically based on the indicated concentrations in the model.

7. A non-transitory computer readable storage medium comprising computer program code to, when loaded into a computer and executed thereon, cause the computer to perform the steps of a method as claimed in claim 1.

8. A system for clustering computer systems in a plurality of systems to identify computer systems being subject to a common security occurrence, each computer system generating data records corresponding to security events in respect of the systems, the system including a processor and memory storing computer program code which when executed by the pre causes the system to at least be configured to:
- receive a set of one or more data records associated with each computer system, each record including a sequence of data fields;
- generate a vector embedding for each data field in each record;
- evaluate a distance of each vector embedding from a reference vector as an indicator of semantic distance;
- identify similar data records based on a measure ee of similarity of the distances of vector embeddings for each record;
- define a cluster of computer systems including computer systems associated with the similar data records for applying protective measures to the computer systems in the cluster;
- wherein to identify the similar data records, the system is further configured to:
- generate a model of the measure of a degree of similarity of distances of embeddings for each record including an indication of a number of distances for the record being within a series of predetermined ranges of distance, the indication identifying a degree of concentration of each range of distances for the record; and
- identify records having a degree of concentration meeting a threshold degree in one or more common ranges of distance as similar records based on the model.

9. The system of claim 8 wherein the vector embedding is a prediction-based vector embedding generated with a neural network trained on a corpus of data records of fields to semantically represent the fields.

10. The system of claim 8 wherein the reference vector is selected statistically from the vector embeddings for the data fields in the set of data records.

11. The system of claim 10 wherein the reference vector is an average of the vectors embeddings for the data fields.

12. The system of claim 8 wherein the data records include textual representations of security events, and the data fields include sets of one or more words in each record.

13. The system of claim 8 wherein the model is graphically renderable, said model is processed by a further component for identifying clusters graphically based on the indicated concentrations in the model.

14. The system of claim 8 wherein the system is further configured to apply the protective measures to the computer systems in the cluster, wherein the computer systems in the cluster are identified as being subject to the common security occurrence.

15. The system of claim 14 wherein the protective measures include cessation or prevention of network communication by the computer systems in the cluster.

16. The system of claim 14 wherein the protective measures include use of intrusion detection, virus detection and/or anti-malware by the computer systems in the cluster.

17. The method of claim 1 further comprising applying the protective measures to the computer systems in the cluster, wherein the computer systems in the cluster are identified as being subject to the common security occurrence.

18. The method of claim 17 wherein the protective measure is cessation or prevention of network communication by the computer systems in the cluster.

19. The method of claim 17 wherein the protective measure is the use of intrusion detection, virus detection and/or anti-malware by the computer systems in the cluster.

* * * * *